W. H. H. WHITING.
Electric Gas-Lighting Apparatus.
No. 209,594. Patented Nov. 5, 1878.
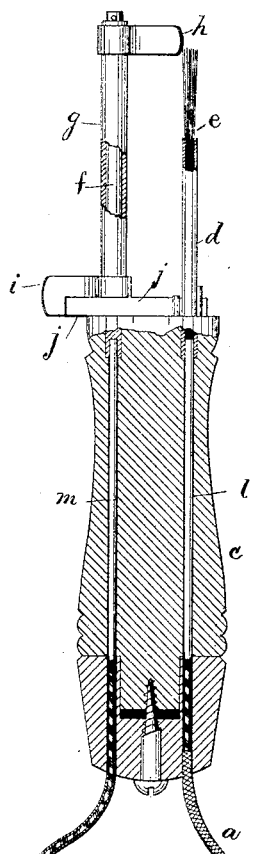
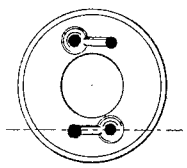
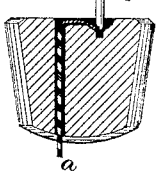
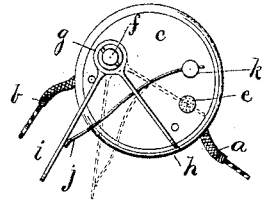
Witnesses.
N. E. Whitney.
L. F. Connor.
Inventor.
William H. H. Whiting
by Crosby & Gregory
Attys

UNITED STATES PATENT OFFICE.

WILLIAM H. H. WHITING, OF CHELSEA, MASSACHUSETTS.

IMPROVEMENT IN ELECTRIC GAS-LIGHTING APPARATUS.

Specification forming part of Letters Patent No. 209,594, dated November 5, 1878; application filed August 26, 1878.

*To all whom it may concern:*

Be it known that I, WM. H. H. WHITING, of Chelsea, county of Suffolk, State of Massachusetts, have invented an Improvement in Electric Gas-Lighting Apparatus, of which the following description, in connection with the accompanying drawing, forming a part thereof, is a specification.

This invention relates to an apparatus to light gas; and has for its object the production of a cheap, efficient, and safe apparatus which, by a slight movement of one of its parts, is made to contact with another part, to thereby establish an electric circuit, which results in the production of a spark or sparks of sufficient power to light the gas flowing from a burner near the parts so brought together to complete the electric circuit.

My improved apparatus is shown embodied in a device made as a handle provided with a metallic brush-like electrode, and with a vibrating electrode adapted to be moved in contact therewith, the said handle being connected by suitable wires with a battery and with the ground.

Figure 1 represents, in elevation and partially in section, an apparatus embodying my invention; Fig. 2, a top view of Fig. 1, and Figs. 3 and 4 details to be referred to.

The wire $a$ may be supposed to be connected with a battery, and the wire $b$ with the ground, or vice versa, through any suitable means or connections. The handle $c$, preferably of wood or hard rubber, has at one end of it a tube, $d$, provided with a metallic brush, $e$, which forms one of the electrodes, and a rod, $f$, about which is placed a sleeve, $g$, having attached at its upper end an arm, $h$, which forms the other electrode. This sleeve is provided with a finger-piece, $i$, which is operated upon by a spring, $j$, connected with the handle at $k$, so as to hold the electrode $h$ away from the electrode $e$, as in full lines, Fig. 2.

This apparatus, intended to be suspended from or below a gas-fixture and placed in electric circuit, as described, may be grasped in the hand, be placed so that the electrodes will be met by the outflowing gas, and then, with the thumb upon the thumb-piece $i$, it may be moved to the position shown in dotted lines, Fig. 2, so as to vibrate the electrode $h$ past and in contact with the electrode $e$, which, by completing the circuit, will cause a spark to be emitted, which will light the gas. The electrode $h$, in its backward movement by the spring $j$, (the thumb being removed from the thumb-piece $i$,) will again make and break the circuit, thus quickly and in succession twice making and breaking the circuit and emitting sparks.

One of these lighters will preferably be attached to each fixture, and their use will result in the prevention of accidents due to the use of matches, which, by the rules of insurance, are not permitted to be used in cotton or woolen factories, and will save much valuable time which is now lost while the person appointed to light the gas as may be needed, he using a lamp, travels from burner to burner, the operators, weavers, spinners, &c., in the meanwhile being idle and the machinery tended by them out of productive operation.

In this instance of my invention the handle is made in two parts, and the wires $a\ b$ are joined with rods $l\ m$, with which are connected the metallic portions $d\ f$.

The brush-like electrode operates to generate more sparks than if a single wire or flexible electrode were used, and the apparatus is thereby made more certain in its action.

I claim—

1. An electric gas-lighting apparatus constructed with a handle, $c$, having wires arranged therein for placing it in electric circuit, in combination with a fixed and a vibrating electrode, operating substantially as and for the purpose described.

2. The handle $c$, adapted to be placed in electric circuit, as set forth, combined with the metallic brush-like electrode, and the vibrating electrode $h$ and the tube and thumb-piece, substantially as described.

3. In a gas-lighting apparatus, the metallic brush-like electrode, combined with a vibrating electrode, and means to move it in contact with and past the brush-like electrode, substantially as described.

In testimony whereof I have signed my name to this specification in the presence of two subscribing witnesses.

WM. H. H. WHITING.

Witnesses:
 G. W. GREGORY,
 N. E. WHITNEY.